United States Patent [19]

Kanazawa

[11] Patent Number: 5,065,302
[45] Date of Patent: * Nov. 12, 1991

[54] ADJUSTABLE AC POWER SUPPLY EQUIPMENT FOR AIR-CONDITIONER SYSTEM

[75] Inventor: Hidetoshi Kanazawa, Fujinomiya, Japan

[73] Assignee: Kabushiki Kaisha Toshiba, Kawasaki, Japan

[*] Notice: The portion of the term of this patent subsequent to has been disclaimed.

[21] Appl. No.: 512,173

[22] Filed: Apr. 20, 1990

[30] Foreign Application Priority Data

Jul. 28, 1989 [JP] Japan .................... 1-195949

[51] Int. Cl.⁵ .............................. H02M 5/42
[52] U.S. Cl. ........................ 363/37; 363/39; 363/65
[58] Field of Search ............ 363/37, 39, 40, 44–48, 363/65, 67, 69, 71

[56] References Cited

U.S. PATENT DOCUMENTS

| | | | |
|---|---|---|---|
| 4,814,964 | 3/1989 | Schauder et al. | 363/65 |
| 4,849,870 | 7/1989 | Heinrich | 363/65 |
| 4,849,950 | 7/1989 | Sugiura et al. | 363/37 |

OTHER PUBLICATIONS

Mitsubishi Denki K.K., "Inverter Application Manual", Nov. 20, 1988, pp. 268–269.

Primary Examiner—Peter S. Wong
Attorney, Agent, or Firm—Foley & Lardner

[57] ABSTRACT

In an adjustable a.c. power supply for an air-conditioner system, comprising a first frequency converter for driving a compressor motor of a first air-conditioner, a second frequency converter for driving a compressor motor of a second air-conditioner, and a common a.c. power supply for delivering a.c. power to both frequency converters, a rectifier included in at least one frequency converter is constructed as a controllable rectifier and subjected to phase-control so that a synthetic higher harmonic current of the two frequency converters as viewed from the a.c. power supply is reduced. By conducting phase-control of plural controllable rectifiers in a manner that, e.g., one rectifier has a phase-control angle of zero degrees and the other rectifier has a phase-control angle of 30 degrees, load current from the a.c. power supply is permitted to have a waveform closer to a sine wave, i.e., a waveform in which higher harmonic components are further reduced.

8 Claims, 8 Drawing Sheets

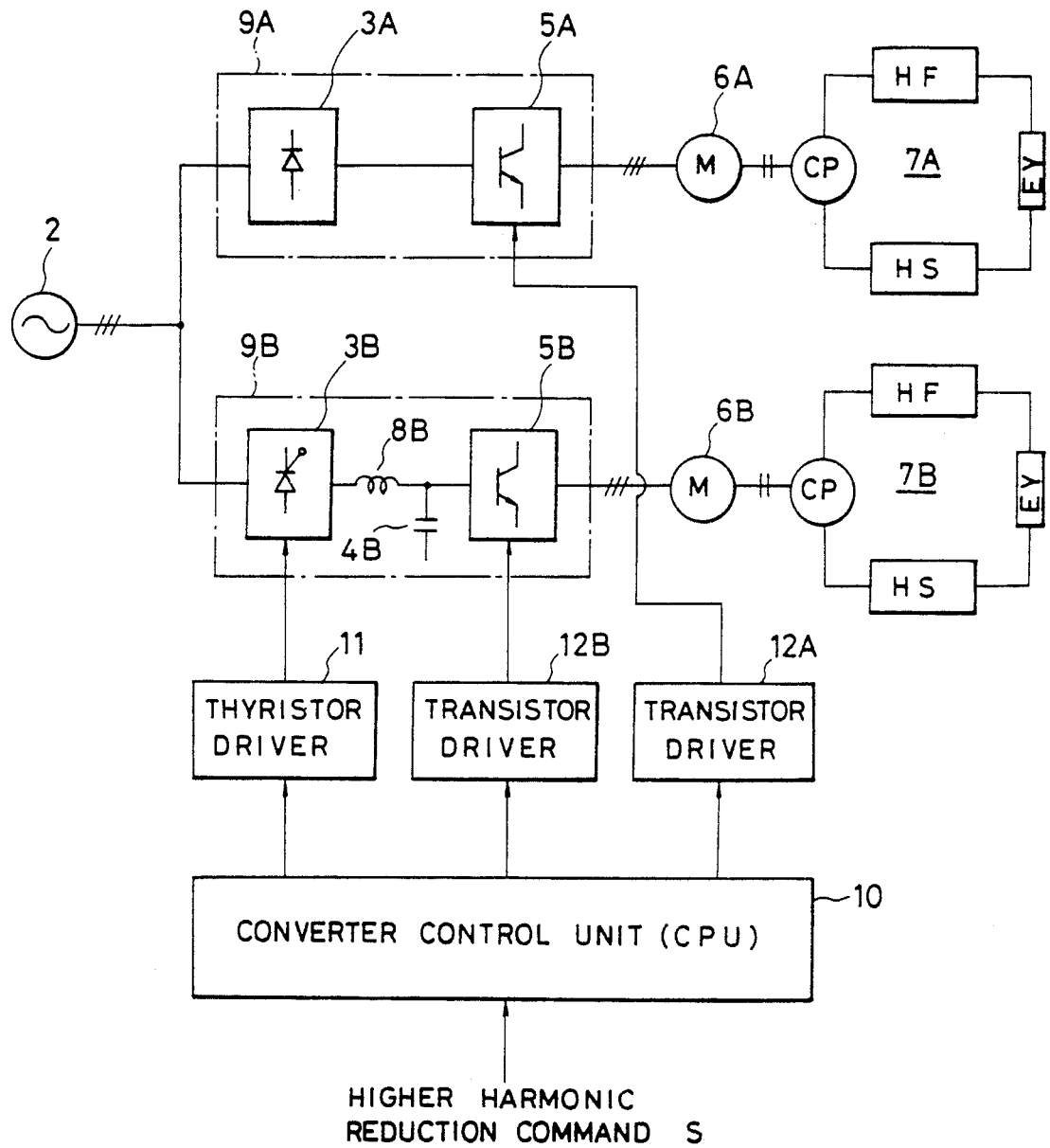
F I G. 1

ADJUSTABLE AC POWER SUPPLY EQUIPMENT FOR AIR-CONDITIONER SYSTEM

FIELD OF THE INVENTION

This invention relates to an adjustable a.c. power supply equipment for an air-conditioner system including frequency converters each comprised of a three-phase rectifier and an inverter.

BACKGROUND OF THE INVENTION

Frequency converters each comprised of a three-phase rectifier and an inverter have been widely used for adjustable speed drive control for an air-conditioner system with the development of semiconductor elements and microcomputers, resulting in the ability to readily obtain precise control. On the other hand, however, when precise control is effected by such equipment, many higher harmonic voltage or current components, occur in circumstance where such higher harmonic voltages or currents exert, adverse influence on other equipment. Thus, measures for reducing such higher harmonic voltages or currents have been required. The management standard for such a higher harmonic problem of this kind is uncertain because of the difficulty in determining its cause. In addition, the scope of responsibility of electric power companies and customers is not clearly defined. Thus, various problems exists.

Typical frequency converters are composed of a three-phase rectifier consisting of diodes, a smoothing capacitor, and a three-phase inverter. The input current of such frequency converters has a waveform different from a normal sine wave, i.e., a waveform including higher harmonics, particularly the fifth higher harmonic component.

For the purpose of reducing higher harmonic components included in load current in the case where such frequency converters are used, e.g., in power supply equipment for an air-conditioner system installed in a building, there has been proposed a system in which two transformers with different connections, e.g., a transformer with delta-delta connection and a transformer with delta-star connection are used to provide two sets of a.c. voltages having a phase difference of 30 degrees to connect frequency converters to their output sides, respectively. In the case of this system, which can be called a phase difference transformer system, input currents to individual frequency converters have distorted waveforms including the above-described higher harmonics, respectively. However, current obtained by synthesizing both input currents, i.e., load current as viewed from the power supply has a waveform closer to a sine wave as a result of compensatory summation of respective distortions, i.e., a waveform including lower harmonic components.

The above-described phase difference transformer system which is known as a measure for reducing higher harmonics, has the advantage that substantially the same configuration is used for both frequency converters, but the drawback that two sets of transformers for the rectifiers are required, resulting in an increased cost.

SUMMARY OF THE INVENTION

This invention has been made in view of the above and its object is to provide an adjustable a.c. power supply equipment for an air-conditioner system, which is capable of reducing higher harmonic current components more inexpensively and efficiently.

In accordance with this invention, the abovementioned object is achieved by adjustable a.c. power supply equipment for an air-conditioner system comprising: a first frequency converter comprised of a three-phase non-controllable rectifier and a first inverter to deliver load current to a compressor motor of a first air conditioner; a second frequency converter comprised of a three-phase controllable rectifier and a second inverter to deliver load current to a compressor motor of a second air conditioner; a common a.c. power supply for delivering a.c. power to both frequency converters; first and second means for controlling the first and second inverters, respectively; third means for effecting a phase control of the rectifier of the second frequency converter in order to reduce synthetic higher harmonic current of both frequency converters viewed from the a.c. power supply.

Furthermore, in accordance with this invention, the above-mentioned object is achieved by adjustable a.c. power supply equipment for an air-conditioner system comprising: a first frequency converter comprised of a three-phase non-controllable rectifier and a first inverter to deliver load current to a compressor motor of a first air-conditioner; a second frequency converter comprised of a three-phase controllable rectifier and a second inverter to deliver load current to a compressor motor of a second air conditioner; a common a.c. power supply for delivering a.c. power to the both frequency converters; first and second means for controlling the first and second inverters, respectively; third means for controlling the controllable rectifier of the second frequency converter; and fourth means for operating the controllable rectifier of the second frequency converter at a phase-control angle of zero in a normal state, wherein when the fourth means receives a higher harmonic reduction command, it shifts a phase-control angle of the controllable rectifier in order that synthetic higher harmonic current of both frequency converters is reduced as viewed from the a.c. power supply.

Furthermore, in accordance with this invention, the above-mentioned object is achieved by adjustable a.c. power supply equipment for an air-conditioner system comprising: at least three sets of frequency converters each comprised of a three-phase controllable rectifier and an inverter to deliver load currents to compressor motors of individual air-conditioners, respectively; a common a.c. power supply for delivering a.c. power to the frequency converters; control means for controlling the respective frequency converters; operating state detection means for detecting ON/OFF states of the respective frequency converters and estimating load current; means for estimating the total current of the frequency converters being operated in accordance with a detected result from the operating state detection means; and means responsive to a higher harmonic reduction command to classify the frequency converters being operated in two groups thereof so that the total current is substantially equally divided in half, to thus control one group of controllable rectifiers and the other group of controllable rectifiers so that there is a phase-control angle difference of substantially 30 degrees therebetween.

In accordance with this invention, one group of rectifiers is operated at a phase-control angle of zero degrees and the other group of rectifiers is operated at a suitable control angle, e.g., 30 degrees, when it receives a higher harmonic reduction command. Thus, a load current supplied from the common a.c. power supply as a synthetic current of the both rectifiers can have a waveform closer to a sine wave, i.e., a waveform in which higher harmonic components are further reduced.

BRIEF DESCRIPTION OF THE DRAWINGS

In the accompanying drawings:

FIG. 1 is a block diagram showing an embodiment of an adjustable a.c. power supply for an air-conditioner system according to this invention.

LED DESCRIPTION OF THE PREFERRED EMBODIMENTS

FIG. 1 shows embodiment of an adjustable a.c. power supply equipment for an air-conditioner system according to this invention.

In the circuit shown in FIG. 1, an a.c. power having a controlled a.c. voltage and a controlled frequency is delivered from a commercial three-phase a.c. power supply 2 to a first a.c. motor 6A through a first frequency converter 9A including a three-phase non-controllable rectifier 3A comprised of diodes and an inverter 5A comprised of power transistors. The frequency converter 9A is of so called unfiltered type such that an input capacitor, etc. is not connected between the rectifier 3A and the inverter 5A. Furthermore, an a.c. power having a controlled a.c. voltage and a controlled frequency is delivered from the common a.c. power supply 2 to a second a.c. motor 6B through a second frequency converter 9B including a three-phase controllable rectifier comprised of thyristors, a smoothing circuit or filter comprised of a series reactor 8B and a parallel capacitor 4B, and an inverter 5B comprised of power transistors.

The first a.c. motor 6A is a compressor motor for driving a compressor CP of a first refrigerating cycle 7A. Similarly, the second a.c. motor 6B is a compressor motor for driving a compressor CP of a second refrigerating cycle 7B. Each of the refrigerating cycles comprises a compressor CP, a first heat exchanger HF, an expansion valve EV, and a second heat exchanger HS. These first and second refrigerating cycles are included in first and second air-conditioners, respectively. One of the two heat exchangers HF and HS is used as an indoor unit heat exchanger, and the other is used as an outdoor unit heat exchanger.

The controllable rectifier 3B is subjected to firing-control by a converter control unit (CPU) through a thyristor driver 11. The inverters 5A and 5B are subjected to PWM (Pulse Width Modulation) control by the converter control unit 10 through transistor drivers 12A and 12B, respectively. The controllable rectifier 3B is operated by the converter control unit 10 at a phase-control angle of zero degrees in a normal state in the same manner as in the non-controllable rectifier. When a higher harmonic reduction command S is delivered to the converter control unit 10, however, the controllable rectifier 3B is operated at a phase-control angle $\alpha = 30°$.

Prior to the description of the operation of the equipment shown in FIG. 1, the aspect of the principle thereof will be first explained with reference to FIGS. 2 and 3.

Figure 2:
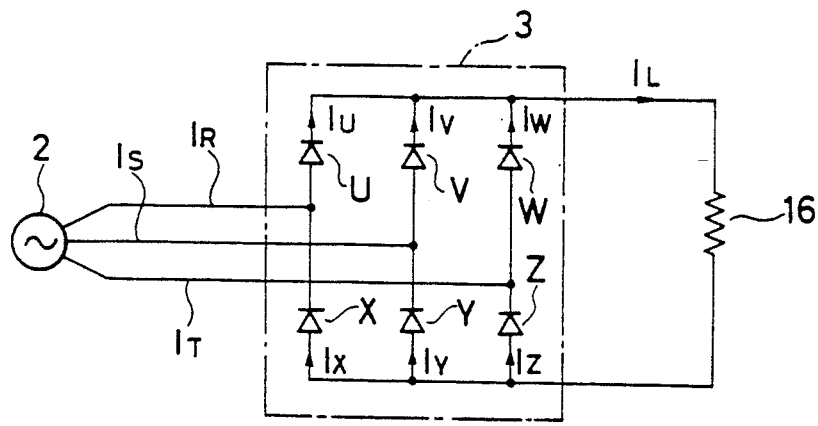
FIG. 2 is a connection diagram showing a circuit arrangement of a rectifier.
Figure 5:
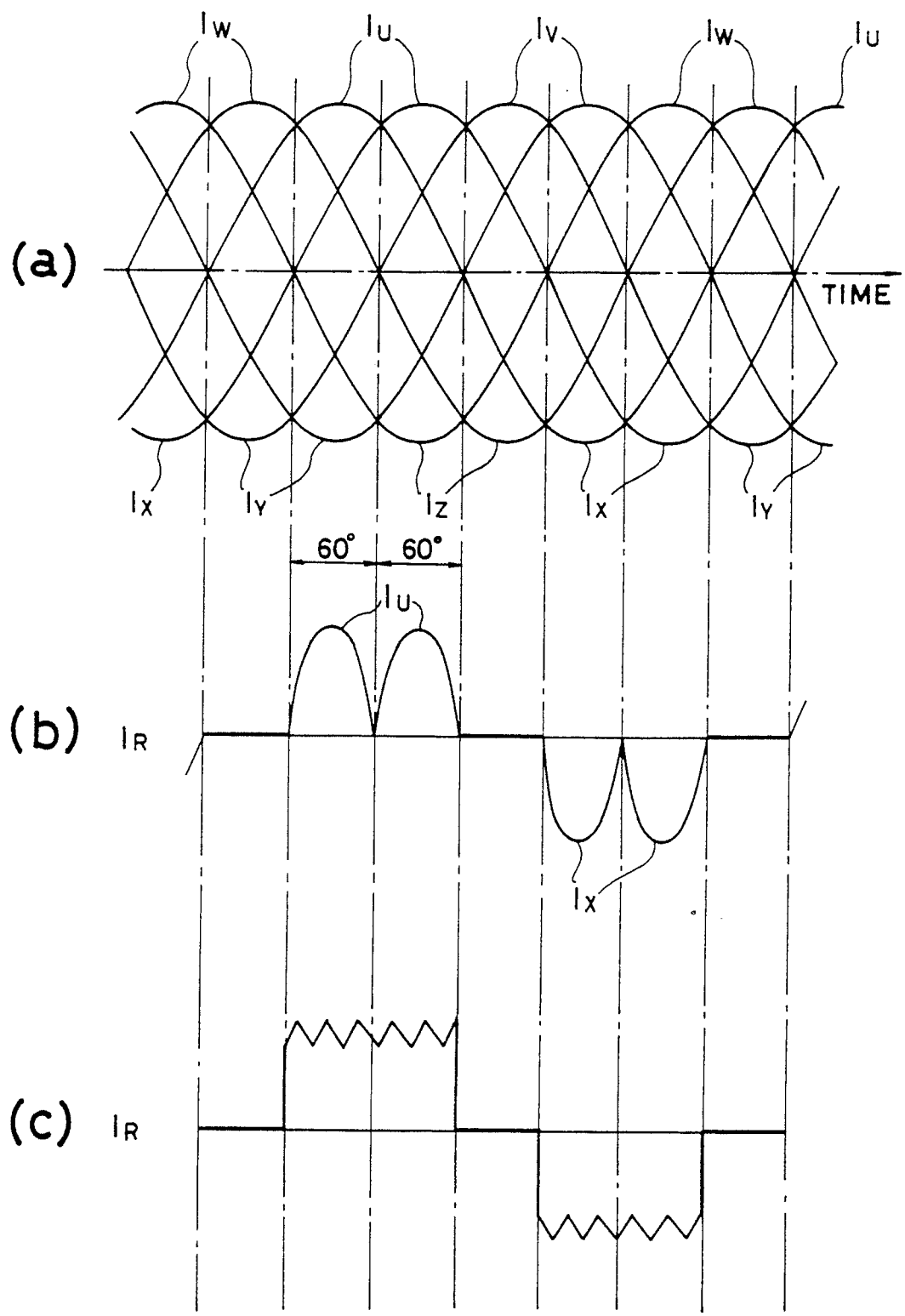
FIGS. 5a to 5c are graphs for explaining the output current waveforms of a non-controllable rectifier, respectively.

Attention is now called to the circuit for delivering power from an a.c. power supply 2 to load 16 through a non-controllable rectifier 3 comprised of connected as a three-phase bridge rectifier circuit as shown in FIG. 2 wherein an equivalent resistor is taken as the load 16. Currents flowing in respective arms U, V, W, X, Y and Z, i.e., arm currents $I_U$, $I_V$, $I_W$, $I_X$, $I_Y$ and $I_Z$ in such a typical non-controllable rectifier circuit are as follows. Namely, as shown in FIG. 5a, currents flowing in individual arms have phase angle differences of 120 degrees and currents on the positive and negative sides of corresponding arms have phase angle differences of 60 degrees, respectively. As line currents $I_R$, $I_S$ and $I_T$ on the a.c. side of the rectifier circuit 3, there are nearly square-waved currents in form repeating the current on the positive side for a period of 120 degrees, with no current for a period of 60 degrees, current on the negative side for a period of 120 degrees, and of no current for a period of 60 degrees, respectively. It is to be noted that load current $I_L$ in the load 16 is a synthetic current of arm currents Iu, Iv and Iw or arm currents Ix, Iy and Iz.

Figure 3:
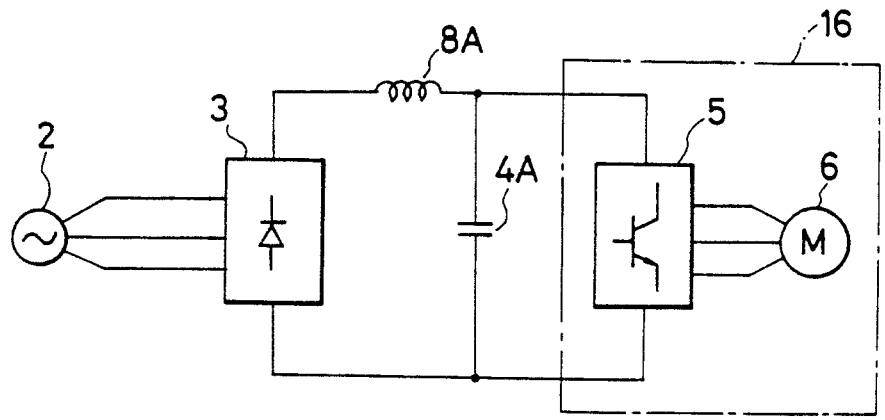
FIG. 3 is a circuit diagram showing an arrangement of a frequency converter where a capacitor input type inverter is connected to the output side a rectifier.

In contrast, as shown in FIG. 3, in the case where load 6 is connected through a capacitor input type inverter including an input reactor 8A connected in series and an input capacitor 4A connected in parallel on the load side of the non-controllable rectifier 3, a line current, e.g., a R-phase line current IR, as shown in FIG. 5b, has a waveform with two sinusoidal convex portions within a half cycle.

Figure 4:
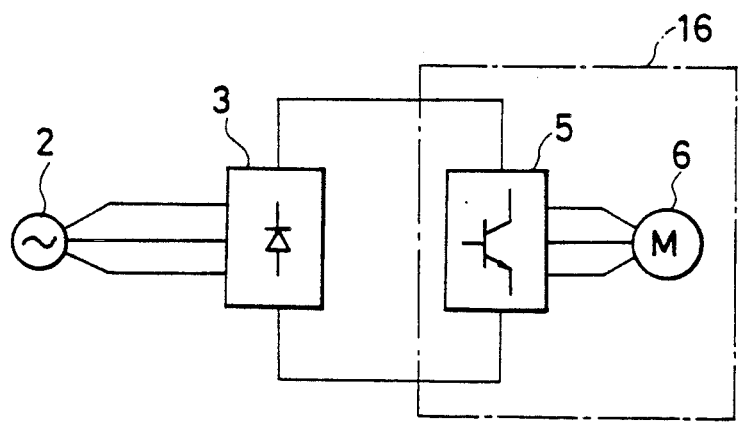
FIG. 4 is a circuit diagram showing an arrangement of can unfiltered type frequency converter where the output side of a rectifier is directly connected to the input side of the inverter.

In addition, the line current $I_R$ in the case of a so called unfiltered inverter, where an input reactor and an input capacitor are not connected between the rectifier 3 and the inverter 5, as shown in FIG. 4 has a waveform closer to a rectangular waveform including ripples corresponding to the PWM frequency of the inverter as shown in FIG. 5c.

Figure 6:
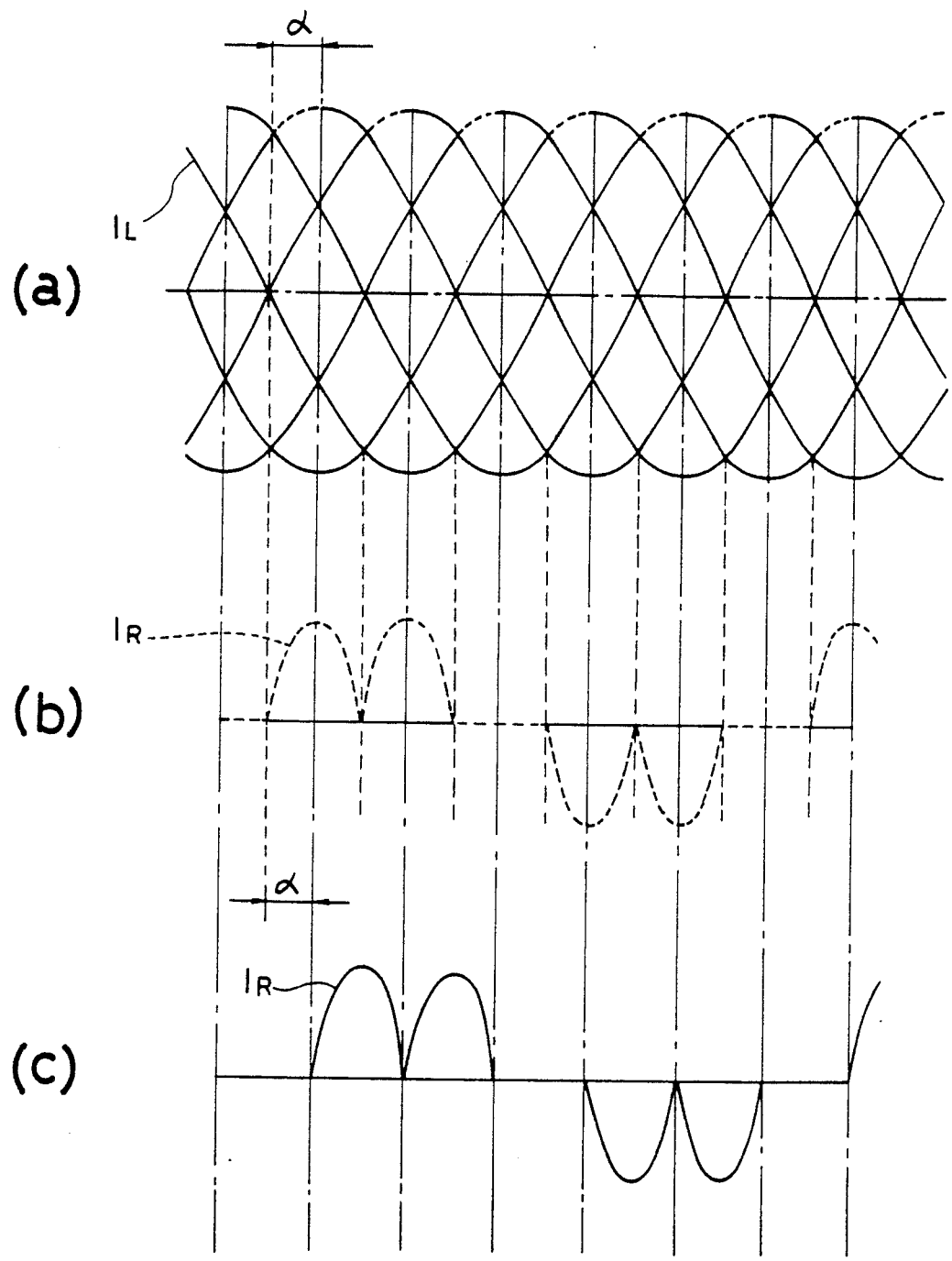
FIGS. 6a to 6c are graphs for explaining the output current waveforms of the rectifier with phase-control, respectively, FIGS. to 7a to 7c are graphs for explaining the waveform of current obtained by synthesizing an output current from a rectifier which carries out no phase-control and an output current from a rectifier with phase-control, respectively.

In the case where the rectifier is constructed as a controllable rectifier 3B as shown in FIG. 1, a sawtooth load current $I_L$ flows in accordance with a phase-control angle $\alpha$ of the controllable rectifier 3B ($\alpha \approx 30°$ in the case illustrated) as shown in FIG. 6a. In accordance with this invention, the controllable rectifier is operated at a phase-control angle $\alpha = 0°$. The fact situation of $\alpha = 0°$ is equivalent to the situation where the controllable rectifier is virtually constructed as a non-controllable rectifier comprised of diodes. As a result, a line current $I_R$ having a waveform shown in FIG. 6b flows. This waveform is the same as the waveform shown in FIG. 5b previously described. It is now assumed that the phase-control angle $\alpha$ of the controllable rectifier 3B is shifted so that it equal to 30 degrees. The line current $I_R$ in this case becomes a line current shifted by a phase-control angle $\alpha = 30°$ as shown in FIG. 6c as compared to the case of $\alpha = 0°$ (FIG. 6b)

Figure 7:
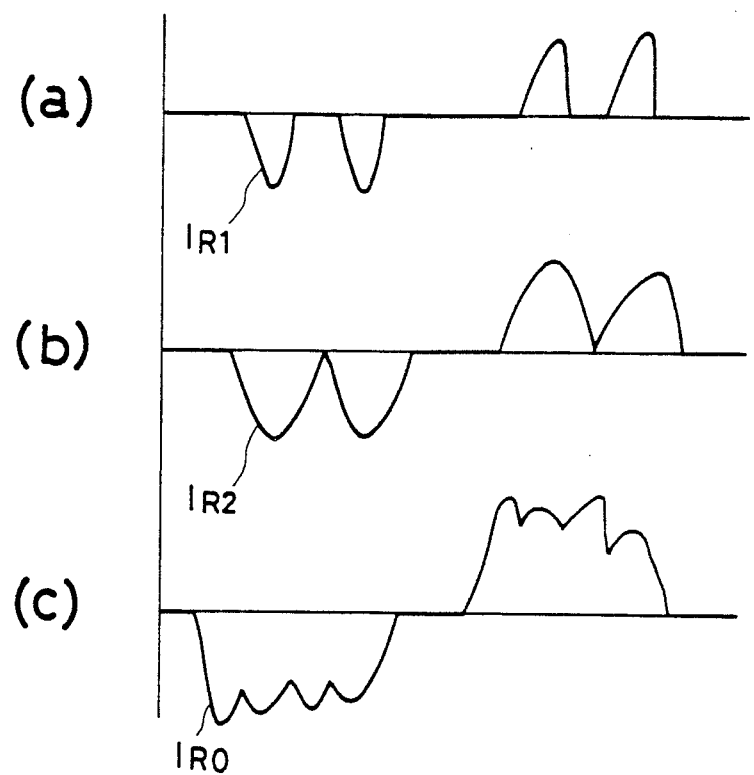

On the premise that the capacitor input type inverter is used as load, with reference to FIG. 7, attention is drawn to line current $I_{R0}$ synthesized by a line current $I_{R1}$ flowing through the non-controllable rectifier 3A and a line current $I_{R2}$ flowing through the controllable rectifier 3B operated at a predetermined phase-control angel $\alpha$, e.g., $\alpha = 30°$. In this instance, line current having a waveform shown in FIG. 7a is provided as a line current $I_{R1}$ flowing through the non-controllable rectifier 3A. Furthermore, line current having a waveform shown in FIG. 7b is provided as line current $I_{R2}$ flowing through the controllable rectifier 3B. In addition, line current having a waveform shown in FIG. 7c is provided as a current obtained by synthesizing both line currents $I_{R1}$ and $I_{R2}$, i.e. a R-phase line current $I_{R0}$ as viewed from the a.c. power supply 2. It is seen from FIG. 7c that there is provided a current waveform closer to a sine wave, i.e., a current waveform having less higher harmonic components.

In view of this, this invention employs a scheme such that where two sets of frequency converters 9A and 9B are connected to the a.c. power supply 2, and when not only the non-controllable rectifier 3A but also the controllable rectifier 3B are operated at a phase-control angle $\alpha = 0°$ in a normal state, and the controllable rectifier 3B is operated at a phase-control angle $\alpha = 30°$ when a higher harmonic reduction command S is input. This permits the higher harmonic current components as viewed from the a.c. power supply 2 side to be reduced to a great extent.

In accordance with an example of an experiment, the fifth higher harmonic component included by about 40% in the case where two sets of frequency converters each including a capacitor input type inverter as shown in FIG. 3 are operated so that the both rectifiers have a phase-control angle $\alpha = 0°$ (are in non-controlled state) could be reduced to less than 20% as viewed from the a.c. power supply 2 side by allowing the rectifier of one frequency converter to be of a controllable type to operate it at a phase-control angle $\alpha = 30°$. Furthermore, the fifth higher harmonic component included by about 20% in the case of combining an unfiltered less frequency converter as shown in FIG. 4 and a frequency converter having a capacitor input type inverter as shown in FIG. 3 to operate the both rectifiers at a phase-control angle $\alpha = 0°$ (in a non-controlled state) could be reduced to less than 10% by allowing the latter rectifier to be of a controllable type to operate it at a phase-control angle $\alpha = 30°$.

Figure 8:
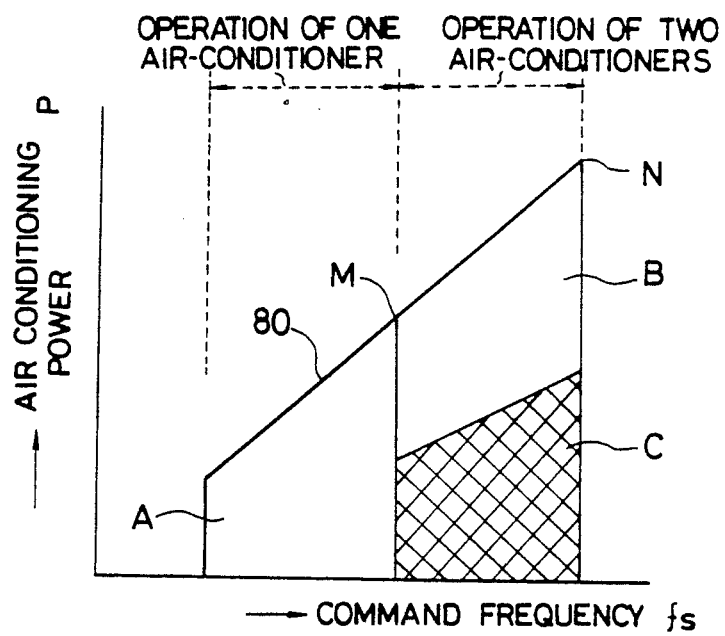
FIG. 8 is a characteristic diagram showing an example of the characteristic command frequency and shared powers for respective systems in a multi air-conditioner system.

It is assumed that, as indicated by the characteristic line 80 in FIG. 8, there is employed an approach to produce a command frequency $f_s$ corresponding to an air-conditioner load to exhibit air-conditioning power P corresponding thereto. In the region A up to the point M where only one frequency converter is operated, only the first refrigerating cycle 7A is operated by the first frequency converter 9A. Furthermore, in the region from the point M to the point N where two frequency converters are operated, both systems substantially equally share this load. In the figure, the B region is a region shared by the first frequency converter 9A and the C region is a region shared by the second frequency converter 9B. In this instance, operation is conducted by a higher harmonic reduction command S or at a phase-control angle $\alpha = 30°$ even if there is no higher harmonic reduction command S. By carrying out such an operation, the synthetic higher harmonic current in the case where two rectifiers are operated can be reduced in the previously described manner. It is to be noted that when there is employed, in the region A where a single frequency converter is operated, the approach of operating the rectifier 3B of the second frequency converter of the controllable type at a phase-control angle $\alpha = 0°$ in the absence of the higher harmonic reduction command S in place of the rectifier 3A of the first frequency converter of the non-controllable type, substantially the same operation and advantages as above can be attained.

In addition, in an air-conditioner system including a plurality of outdoor units and a plurality of indoor units connected to the respective outdoor units as in an air-conditioner system for a building, frequency converters are installed for every outdoor unit. In such a case, if large differences do not exist between the capacities of the respective systems, as a whole, rectifiers of substantially one half of the frequency converters are operated at a phase-control angle $\alpha = 0°$ and rectifiers of the remaining frequency converters are operated at a phase-control angle $\alpha = 30°$. Thus, the same operation and advantages as in the case of two sets of frequency converters can be provided.

Figure 9:
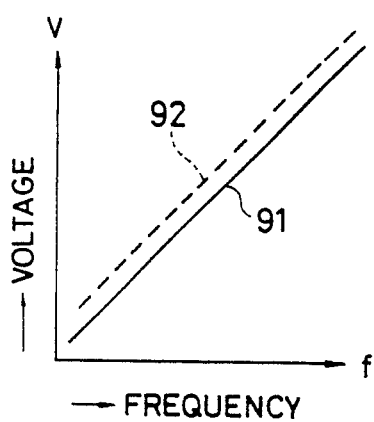
FIG. 9 is a graph for explaining the relationship between output frequency and output voltage of the inverter.

The ratio V/f between the output voltage V and the output frequency f of the inverter is controlled so that it becomes equal to a substantially constant value in compliance with demand from the motor side as indicated by the solid line 91 in FIG. 9. In the case of operating a controllable rectifier at a predetermined phase-control angle, e.g., 30°, the d.c. voltage is lowered depending upon that phase-control angle. For the purpose of compensating for a value corresponding to a d.c. voltage drop, it is desirable to shift the line indicative of the ratio V/f upward so that the value of the voltage V becomes larger with respect to the same frequency as indicated of the broken lines 92 in FIG. 9. The flowchart in for the case of carrying out such control is shown in FIG. 10.

Figure 10:
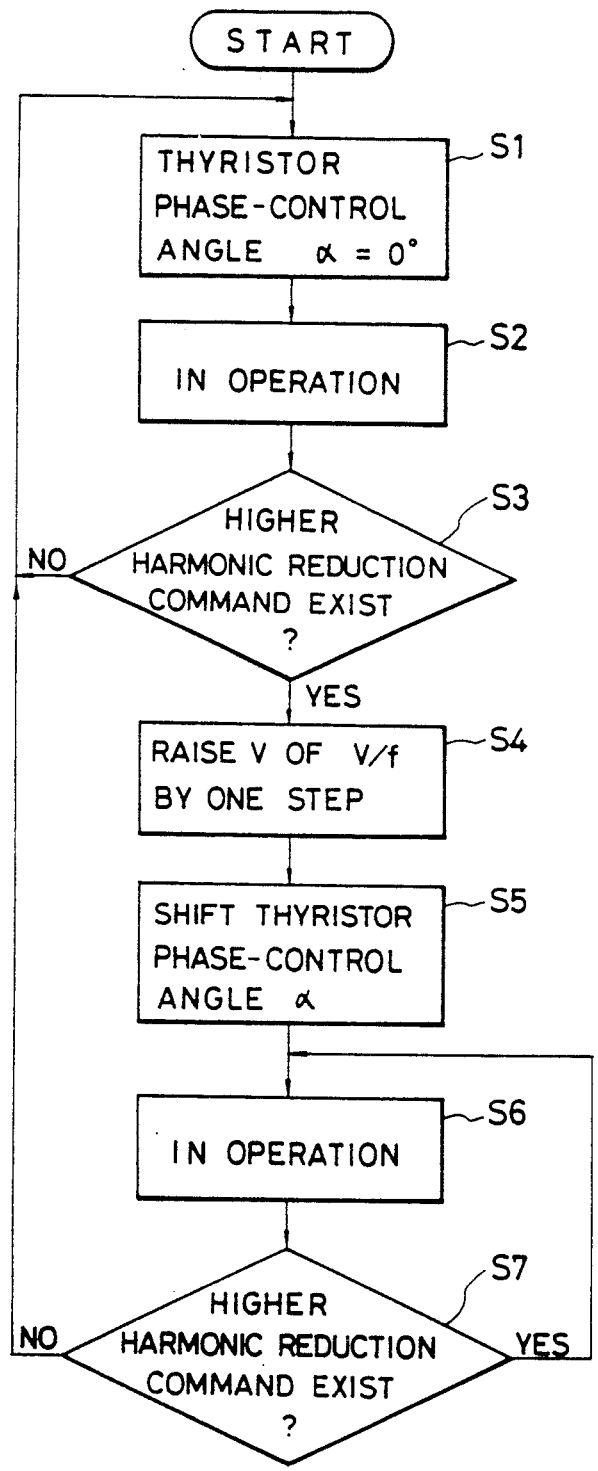
FIG. 10 is a flowchart for explaining a control mode of the power supply shown in FIG. 1.

FIG. 10 shows a control mode for the frequency converter 9A (FIG. 1) comprised for the controllable rectifier 3A and the inverter 5A. Initially, the controllable rectifier 3B is set at a phase-control angle $\alpha = 0°$ to continue an operation by an operating command from the indoor unit side (steps S1, S2). As long as there is no higher harmonic reduction command S, the above-mentioned operation is continued (step S3→ step S1). When a higher harmonic reduction command S is input, the voltage V is allowed to have a characteristic such that it is shifted upwardly in correspondence with a d.c. voltage drop based on control at a phase-control angle $\alpha=30°$ in accordance with the broken lines 92 (FIG. 9) in order to compensate an output voltage of the inverter 5A by an input voltage drop thereof (step S4). In addition, the phase-control angle α of the controllable rectifier 3B is shifted to 30 degrees (step S5) to continue operation thereof (step S6). This operating state is continued as long as there is a higher harmonic reduction command S, and is returned to the initial operating state based on the phase-control angle $\alpha=0°$ when the higher harmonic reduction command S is lost (step S7→step S1).

While the controllable rectifier 3B is comprised of thyristors in the embodiment shown in FIG. 1, other controllable rectifier elements, e.g., transistors may be used in place of thyristors from the viewpoint of controllability. Similarly, rectifier elements constituting the inverters 5A and 5B may be changed to other switching elements except for the transistors, e.g., thyristors.

Another embodiment will now be described.

There are instances where a plurality of frequency converters are provided and the capacities of respective systems are different. For example, a multi air-conditioner system installed in a building corresponds to one of the above-mentioned instances. Namely, in such a multi air-conditioner system, there are a large number of rooms subject to air-conditioning. In addition, areas of respective rooms are different and a large number of refrigerating cycles, i.e., compressor capacities provided for indoor units are different. In such a case, merely equalizing the number of rectifiers operated at a phase-control angle $\alpha=0°$ and the number of rectifiers operated at a phase-control angle $\alpha=30°$ does not necessarily attain the expected object.

Figure 11:
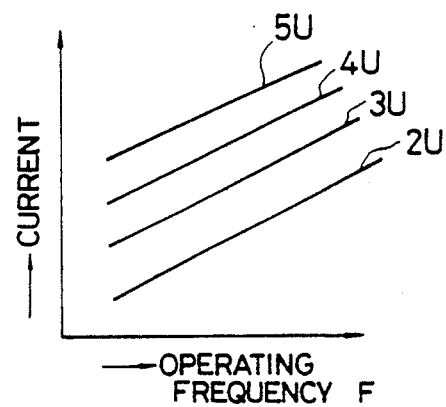
FIG. 11 is a characteristics diagram showing the relationship between operating frequency and a load current for the frequency converter in an air-conditioner using the capacity of the refrigerating cycle as a parameter.

The current in a compressor motor connected, as load, to a frequency converter comprised of a rectifier and an inverter, i.e., the current flowing in a rectifier, varies depending upon the operating frequency F and also varies depending upon the capacity as shown in FIG. 11. In this figure, a characteristic where the operating frequency F is taken on the abscissa and a current is taken on the ordinate is conceptually illustrated using capacities 2U, 3U, 4U and 5U as respective parameters. In the case of the air-conditioner, when the operating frequency is thus determined, load current of a frequency converter of that system is also determined. Accordingly, when the operating frequency is determined in accordance with an air-conditioning load of system, load current of a frequency converter of that system can be determined. Since a substantially proportional correlative relationship exists between the load current and the higher harmonic current components included therein, the magnitude of any higher harmonic current component can be balanced by balancing the load current.

Figure 12:
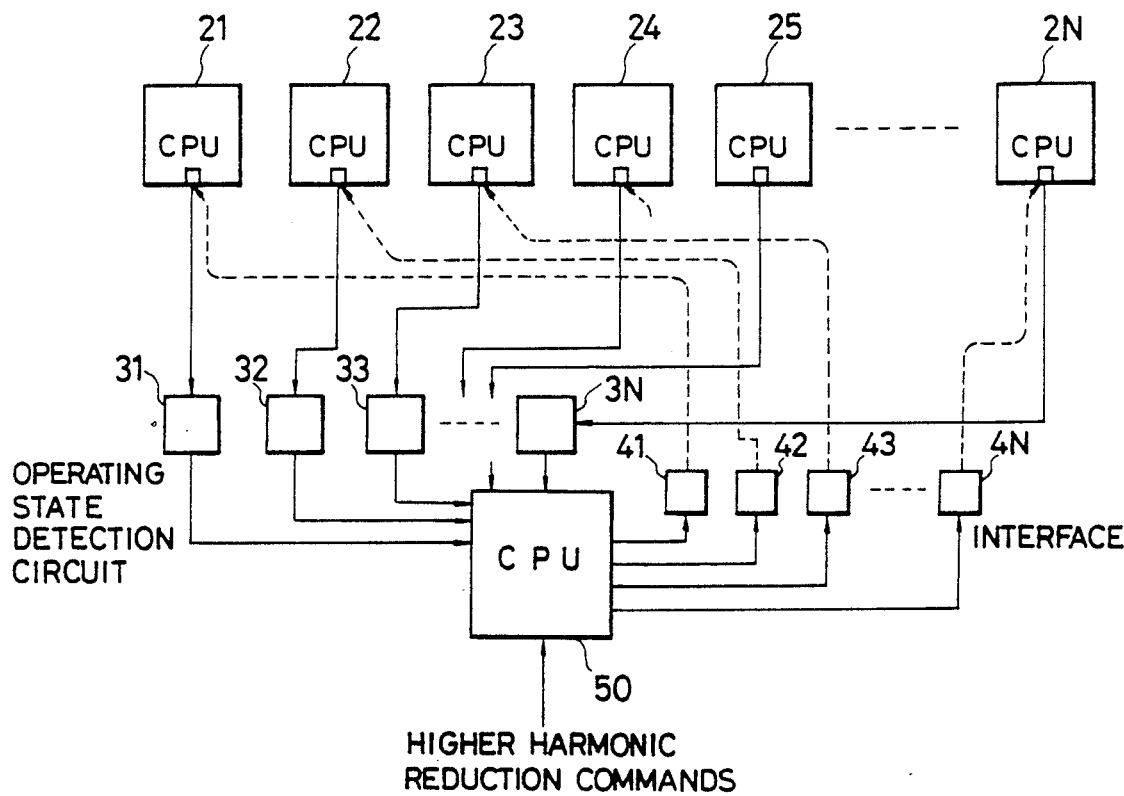
FIG. 12 is a block diagram showing an embodiment where this invention is applied to a multi air-conditioner system.

FIG. 12 shows a further embodiment of this invention constructed in accordance with the above idea. Refrigerating cycle, outdoor unit controllers 21, 22, 23, 24, 25 ... 2N each including a CPU are provided, respectively. By these outdoor unit controllers, the ON/OFF states and the operating frequencies of frequency converters and refrigerating cycles to which the respective controllers belong are controlled. These outdoor unit controllers are controlled from control commands from corresponding indoor unit controllers (not shown), respectively. The ON/OFF states and the operating frequencies F of the outdoor unit controllers 21 to 2N are detected by operating state detection circuits 31, 32, 33 ... 3N, respectively. Detected results are input to a common higher harmonic control unit 50 comprised of a CPU. The higher harmonic control unit 50 responds to detected results from the operating state detection circuits 31 to 3N and the higher harmonic reduction command S to produce, for outdoor controllers 21 to 2N through interfaces 41, 42, 43 ... 4N, a command to the effect of $\alpha=0°$ or $\alpha=30°$ as phase-control angles of rectifiers belonging thereto in a manner determined as described later, respectively.

In that case, a determination as to whether or not the phase-control angle is equal to zero degrees or 30 degrees will be made as follows.

Figure 13:
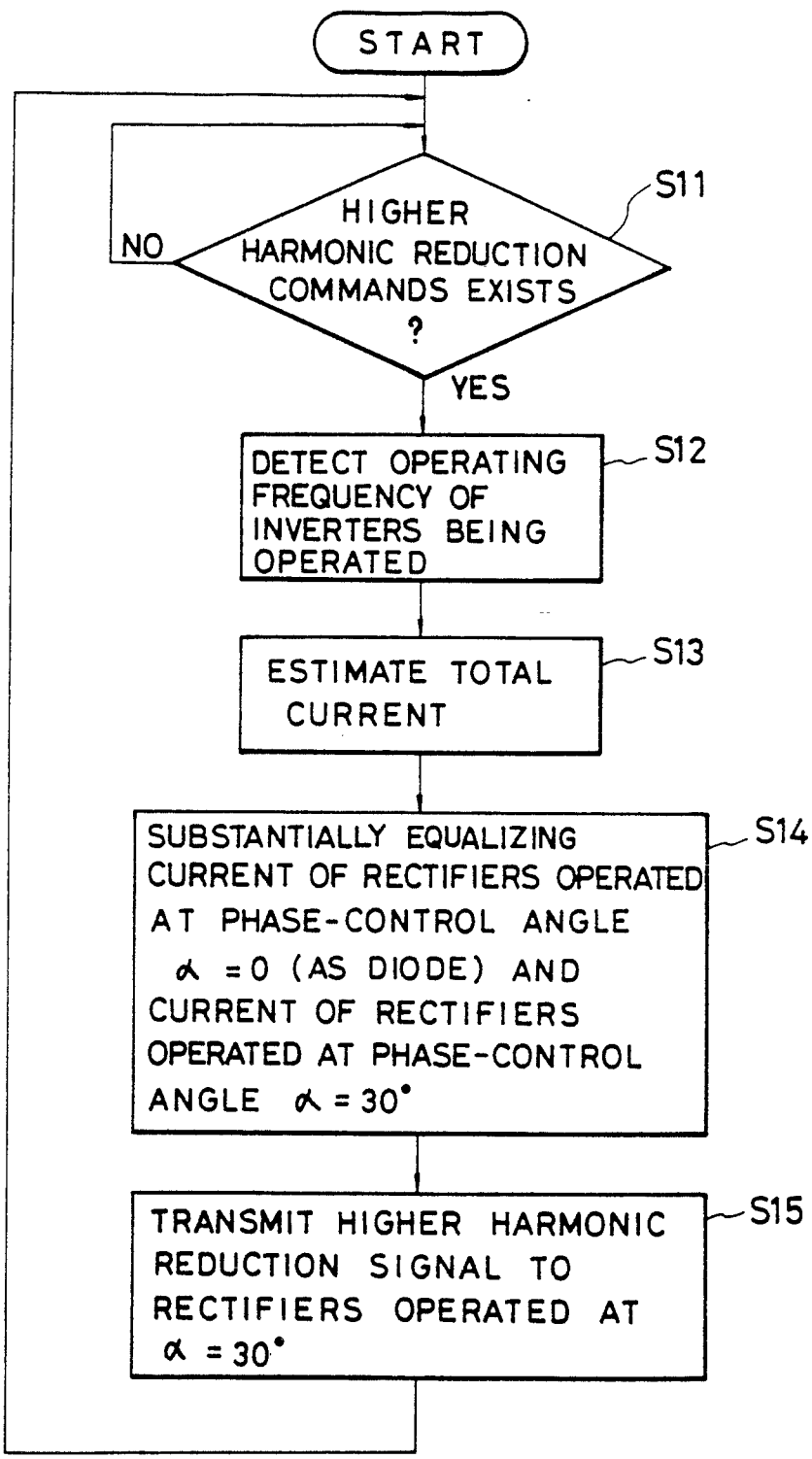
FIG. 13 is a flowchart for explaining a control mode of the embodiment shown in FIG. 12.

As shown in FIG. 13, the higher harmonic control unit 50 first confirms whether or not there is a higher harmonic reduction command S (step S11). In the case of an absence of that command, the current operating state is continued as it is. In contrast, in the case of the presence of that command, the higher harmonic control unit 50 takes thereinto operating frequencies of respective inverters being operated in accordance with the detected results from the operating state detection circuits 31 to 3N (step S12) to estimate the total current of the inverters being operated on the basis of such a characteristic as illustrated in FIG. 11 (Step S13). Then, the higher harmonic wave control unit 50 classifies all rectifiers of the systems being operated into a group of rectifiers operated at a phase-control angle $\alpha=0°$ and a group of rectifiers operated at a phase-control angle $\alpha=30°$ (step S14). Then, the higher harmonic control unit 50 transmits a higher harmonic reduction signal to outdoor unit controllers for controlling rectifiers classified so that they are operated at a phase-control angle $\alpha=30°$ through interfaces belonging thereto (step S15). In this way, even in the case where a plurality of frequency converters having different capacities are provided, operation under the state where higher harmonic components are included as little as possible can be continued.

In this case, there may be employed a scheme in which substantially one half of all rectifiers are allowed to be of a non-controllable type, or when they are of a controllable type, their phase-control angles α are fixed to zero degrees, whereby rectifiers of both types can be selected in accordance with a suitable combination thereof every time. In addition, there may be employed a scheme to allow all rectifiers to be of a controllable type to set the phase control angle α to zero or 30 degrees every time.

what is claimed is:

1. Adjustable a.c. power supply equipment for an air-conditioner system comprising:
   a first frequency converter comprised of a three-phase non-controllable rectifier and a first inverter to deliver load current to a first compressor motor of a first air-conditioner, said first inverter being an unfiltered inverter;
   a second frequency converter comprised of a three-phased controllable rectifier and a second inverter to deliver load current to a second compressor motor of a second air-conditioner, said second inverter being a capacitor input voltage type inverter;
   a common a.c. power supply for delivering a.c. power to both said frequency converters;

first and second means for controlling said first and second inverters, respectively;

third means for carrying out phase-control of said controllable rectifier in order to reduce synthetic higher harmonic current of both said frequency converters as viewed from said a.c. power supply and for controlling said controllable rectifier at a phase angle of substantially 30 degrees.

2. Adjustable a.c. power supply equipment for an air-conditioner system comprising:

a first frequency converter comprised of a three-phase non-controllable rectifier and a first inverter to deliver load current to a first compressor motor of a first air-conditioner;

a second frequency converter comprised of a three-phase controllable rectifier and a second inverter to deliver load current to a second compressor motor of a second air-conditioner;

a common a.c. power supply for delivering a.c. power to both said frequency converters;

first and second means for controlling said first and second inverters, respecitvely;

third means for controlling said controllable rectifier of said second frequency converter; and fourth means for operating said controllable rectifier of said second frequency converter at a phase-control angle of zero degrees in a normal state, wherein when said fourth means receives a higher harmonic reduction command, said fourth means shifts said phase-control angle of said controllable rectifier so that a synthetic higher harmonic current of both said frequency converters as viewed from said a.c. power supply is reduced.

3. Adjustable a.c. power supply equipment as set forth in claim 2, wherein an amount of shift of said phase-control angle of said controllable rectifier is equal to substantially 30 degrees.

4. Adjustable a.c. power supply equipment as set forth in claim 2, which further comprises:

ratio control means for controlling a ratio V/f between an output voltage V and an output frequency f of each said inverter so that said ratio is kept substantially constant in a normal state, wherein when said ratio control means receives said higher harmonic reduction command, ratio control means steps up an output voltage V of said second inverter of said second frequency converter in accordance with a phase-control angle of said controllable rectifier of said second frequency converter.

5. Adjustable a.c. power supply equipment as set forth in claim 2, wherein said first inverter is an unfiltered inverter, and said second inverter is a capacitor input voltage type inverter.

6. Adjustable a.c. power supply equipment as set forth in claim 2, wherein said first inverter is a capacitor input voltage type inverter, and said second inverter is a capacitor input voltage type inverter.

7. Adjustable a.c. power supply equipment for an air-conditioner system comprising:

a plurality of frequency converters each comprised of a three-phase controllable rectifier and an inverter to deliver load currents to compressor motors of individual air-conditioners, respectively;

a common power supply for delivering a.c. power to said frequency converters;

control means for controlling said frequency converters;

operating state detection means for detecting a detected result including ON/OFF states of said frequency converters and for estimating load current;

means for estimating total current of said frequency converters being operated in accordance with said detected result from said operating state detection means; and means responsive to a higher harmonic reduction command to classify said frequency converters being operated into two groups thereof so that said total current is substantially equally divided in half, to thus control a first group of said controllable rectifiers and a second group of said controllable rectifiers so that there is a phase-control angle difference of substantially 30 degrees therebetween.

8. Adjustable a.c. power supply equipment as set forth in claim 7, wherein said first group of controllable rectifiers has a phase-control angle of zero degrees, and said second group of controllable rectifiers has a phase-control angle of substantially 30 degrees.

* * * * *

UNITED STATES PATENT AND TRADEMARK OFFICE
CERTIFICATE OF CORRECTION

PATENT NO. : 5,065,302

DATED : November 12, 1991

INVENTOR(S) : Hidetoshi Kanazawa

It is certified that error appears in the above-identified patent and that said Letters Patent is hereby corrected as shown below:

On the title page after item [73], please delete the following:
-- [*] Notice: The portion of the term of this patent Subsequent to has been disclaimed.--.

Signed and Sealed this

Sixth Day of July, 1993

Attest:

MICHAEL K. KIRK

*Attesting Officer*     *Acting Commissioner of Patents and Trademarks*